(12) United States Patent
Marangon et al.

(10) Patent No.: US 10,784,651 B2
(45) Date of Patent: Sep. 22, 2020

(54) APPARATUS AND METHOD FOR MEASURING A SIGNAL

(71) Applicant: Kabushiki Kaisha Toshiba, Minato-ku (JP)

(72) Inventors: Davide Marangon, Cambridge (GB); Zhiliang Yuan, Cambridge (GB); Marco Lucamarini, Cambridge (GB); Andrew James Shields, Cambridge (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 16/451,183

(22) Filed: Jun. 25, 2019

(65) Prior Publication Data

US 2019/0393675 A1    Dec. 26, 2019

(30) Foreign Application Priority Data

Jun. 25, 2018   (GB) .................................. 1810414.1

(51) Int. Cl.
*H01S 5/062* (2006.01)
*H01S 3/10* (2006.01)
*H01S 5/00* (2006.01)

(52) U.S. Cl.
CPC ...... *H01S 5/06216* (2013.01); *H01S 3/10053* (2013.01); *H01S 5/0078* (2013.01)

(58) Field of Classification Search
CPC . H01S 5/06216; H01S 5/0078; H01S 3/10053
(Continued)

(56) References Cited

U.S. PATENT DOCUMENTS

2016/0047643 A1* 2/2016 Yuan ...................... H04B 10/70
398/25
2017/0010865 A1* 1/2017 Sanguinetti ........... H04L 9/0852
(Continued)

FOREIGN PATENT DOCUMENTS

EP        3 040 853 A1     7/2016
EP        3040853 A1  *   7/2016  ........... H04L 9/0866

OTHER PUBLICATIONS

British Examination Search report dated Dec. 27, 2018 in GB application 1810414.1, filed on Jun. 25, 2018.
(Continued)

*Primary Examiner* — Dalzid E Singh
(74) *Attorney, Agent, or Firm* — Oblon, McClelland, Maier & Neustadt, L.L.P.

(57) ABSTRACT

An apparatus for measuring an input signal, the apparatus comprising:
a first light source configured to output a sequence of pulses of light, wherein there is a random relationship between the phase of the pulses;
a beam splitter having first and second inputs and first and second outputs, said first input being arranged to receive light pulses from said first light source and the second input being arranged to receive said input signal;
a differencing circuit adapted to subtract signals obtained from the first and second outputs from each other; and output a value; and
a processing circuit adapted to estimate the minimum entropy of said input signal, from the output of the differencing circuit corresponding to a sequence of said light pulses from the first light source.

20 Claims, 13 Drawing Sheets

(58) Field of Classification Search
USPC .......................................................... 398/25
See application file for complete search history.

(56) References Cited

U.S. PATENT DOCUMENTS

2019/0050203 A1* 2/2019 Qi ......................... H04L 9/0852
2019/0243611 A1* 8/2019 Martin ..................... G06F 7/58

OTHER PUBLICATIONS

Gabriel, C. et al. "A Generator for unique quantum random numbers based on vacuum states", Nature Photonics, vol. 4, 2010, pp. 711-715.
Marangon, D. et al. "Source-device-independent Ultrafast Quantum Random Number Generation", Physical Review Letters 118, 2017, pp. 060503-1-060503-5.
Yuan, Z.L. et al. "Robust random number generation using steady-state emission of gain-switched laser diodes", Applied Physics Letters 104, 2014 pp. 261112-1-261112-5.
Xu, B. et al. "High Speed Continuous Variable Source-Independent Quantum Random Number Generation", arXiv:1709.00685, 11 pages.
Marangon, D. et al. "Source-device-independent Ultra-fast Quantum Random Number Generation", arXiv;1509.07390, 12 pages.

* cited by examiner

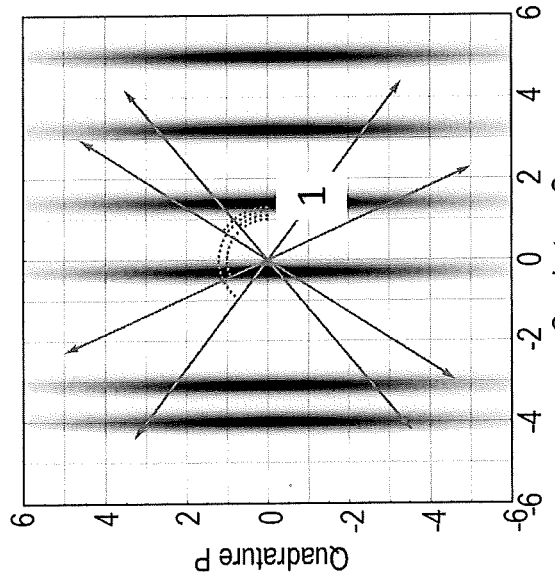
Fig. 10(a)
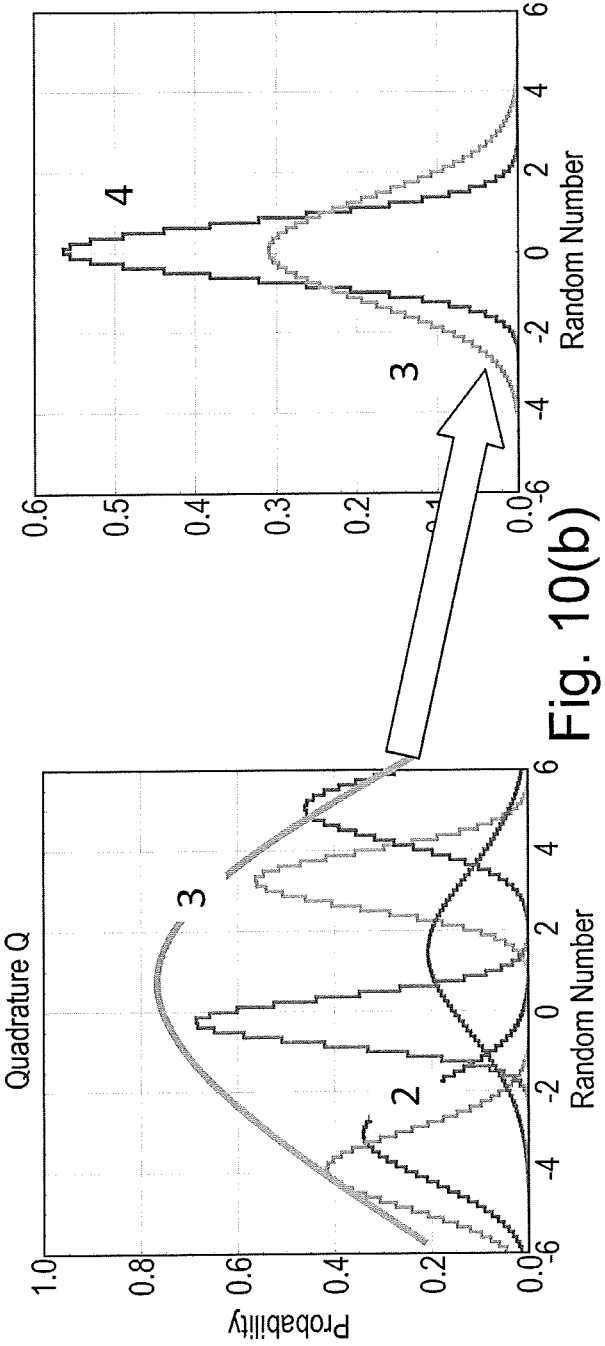
Fig. 10(b)
Fig. 10(c)

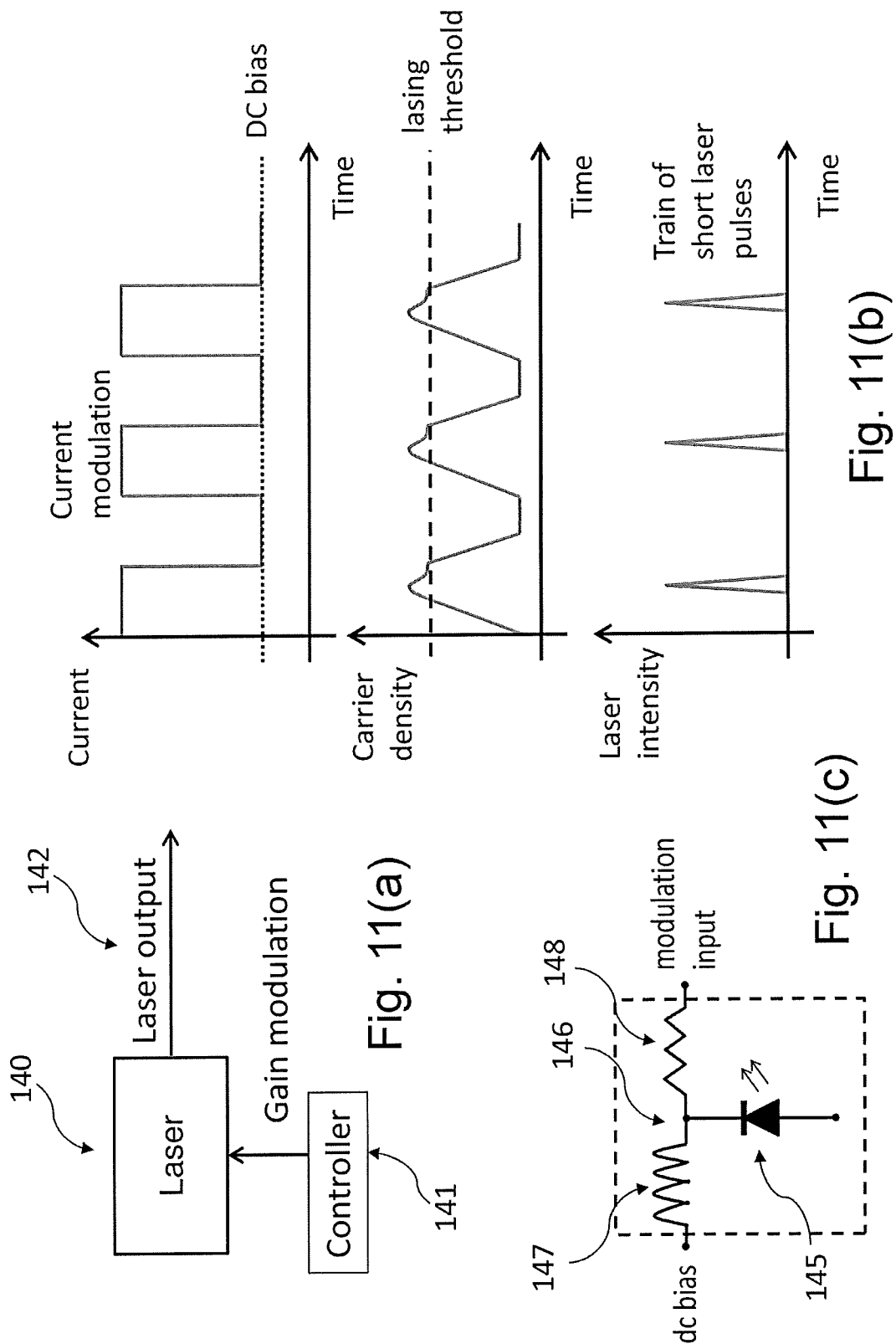

APPARATUS AND METHOD FOR MEASURING A SIGNAL

FIELD

Embodiments described herein relate to an apparatus and method for measuring a signal.

BACKGROUND

The recent development of technologies related to the field of quantum optics has made possible to exploit the quantum nature of the electromagnetic field to perform advanced tasks in the fields of computation, communication, metrology, etc.

For example, the use of optical receiver able to resolve the single quanta of the field, i.e., the photons, has made possible to achieve better sensitivity to detect weak signals. Interplanetary probes implementing optical laser communication with a photon receiver (capable of detecting single photons) on Earth have recently been introduced and will be increasingly developed in the future.

Another task for which the quantum properties of the electromagnetic field have been exploited is for the generation of random numbers. However, the security of measurements that rely on the quantum properties of signals can be compromised if the signals are not pure quantum states. One method for determining the purity of a quantum state is to try to estimate its entropy.

BRIEF DESCRIPTION OF THE FIGURES

FIG. 10(a) shows a potential form of a forged state made up by displaced squeezed states and the effect of randomising the local oscillator phase, FIG. 10(b) shows the random number distribution for each squeezed state shown in FIG. 10(a) measured using a local oscillator with a random phase and FIG. 10(c) shows the total distribution for the squeezed states;

FIG. 11(a) shows a schematic illustration of a gain-switched laser, FIG. 11(b) shows three graphs illustrating the applied current, the carrier density and the laser intensity over time, and FIG. 11(c) shows a schematic illustration of an electrical driving circuit for a semiconductor gain-switched laser.

DETAILED DESCRIPTION

Figure 1A:
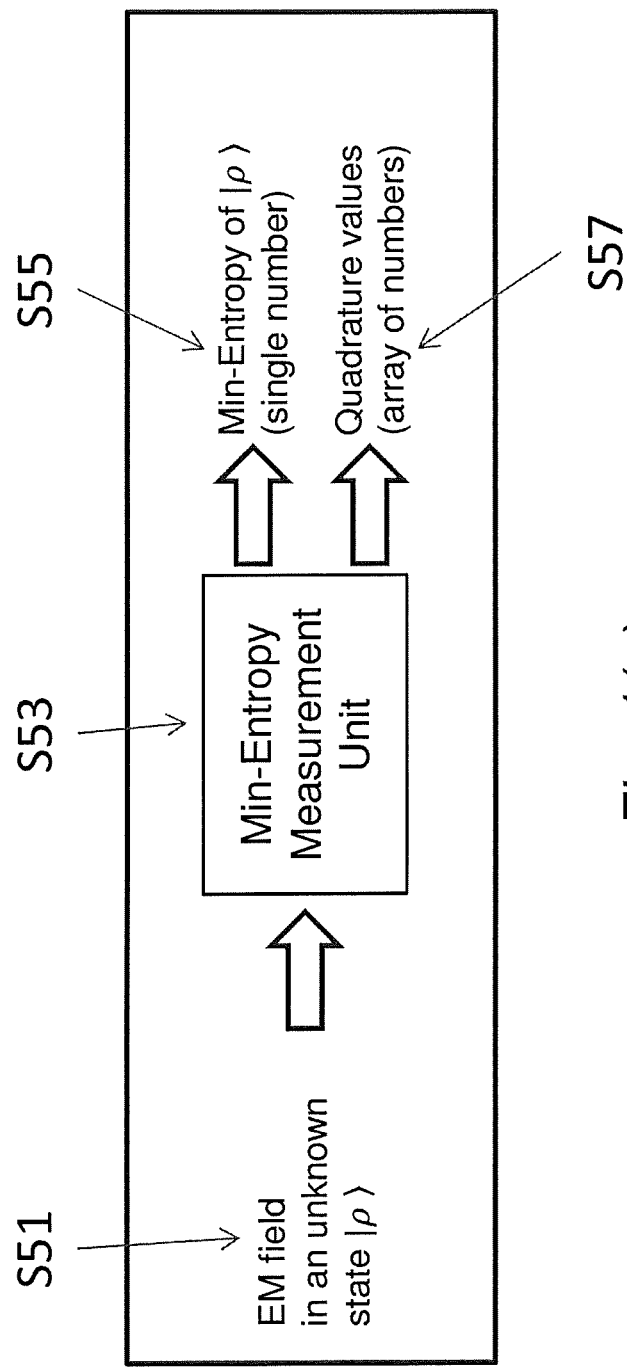
FIG. 1(a) is block/flow diagram of an apparatus to measure the min-entropy of a state of the electromagnetic field.

In an embodiment, an apparatus for measuring an input signal is provided, the apparatus comprising:
- a first light source configured to output a sequence of pulses of light, wherein there is a random relationship between the phase of the pulses;
- a beam splitter having first and second inputs and first and second outputs, said first input being arranged to receive light pulses from said first light source and the second input being arranged to receive said input signal;
- a differencing circuit adapted to subtract signals obtained from the first and second outputs from each other; and output a value; and
- a processing circuit adapted to estimate the minimum entropy of said input signal, from the output of the differencing circuit corresponding to a sequence of said light pulses from the first light source.

The above apparatus can be used as a building block for a random number generator.

In cryptography: random number generators are necessary to produce the key material to allow the encryption of a message. Also, in simulations: random number generators are used to produce the inputs for numerical models used in Monte Carlo methods, to simulate the dynamics of any system (biologic, economic, etc.) that it is too difficult to model analytically. In a further example, random number generators are used in lotteries or in any games that involving guessing chance.

The above apparatus can be used to produce random numbers by measuring the quantum fluctuations of the so-called "quadrature" degree of freedoms of an electromagnetic field. With respect to random number generator based on classical physical processes and deterministic algorithms, such method presents two important advantages. The first is that it enables to generate numbers that are, in principle, unpredictable in sense of quantum mechanics, which is the strongest one. The second is that this method enables to generate at rates in the range of Gigabit per second.

This protocol is commonly called continuous variable quantum random number generation. The typical implementation sees an optical quantum state of the electromagnetic field being fed into a system to perform homodyne or heterodyne optical detection. These systems are used to measure the quadrature degrees of freedom, or observables, of the input quantum state. It is important to stress that the amount of true randomness that can generated from this method directly depends on the kind of state that is inputted in the measurement devices. This means that only some states—the so called pure states—generate numbers that are completely truly unpredictable in the sense of quantum mechanics. Some other states—the so called mixed states—generate numbers that are, in principle, partially or completely predictable. This issue might endanger some applications for which unpredictability is of paramount importance.

Using the above apparatus applied to the case of a CV-QRNG, it is possible to enable a generator to output only the fraction of numbers that is truly unpredictable, whatever the input state is.

Further, the above apparatus can accept as an input signal, an unknown quantum state of the electromagnetic field, measure its quadratures, and produces, as output, the outcomes of the measurement on said state and a quantity called min-entropy. The min-entropy corresponds to the maximal amount of completely unpredictable bits that can be distilled out of that state. At the limit, the min-entropy is null if the input state is not quantum but classical.

The method and apparatus quantifies the entropy of a quantum state. However, given that some building blocks are in common with the CV-QRNG, it can be also used to generate random numbers. In an embodiment, to produce random numbers the apparatus is provided with an additional unit. Such unit takes the quadrature measurement outcomes and the min-entropy as input, and produces completely unpredictable random numbers as output.

In an embodiment, the apparatus is configured as a random number generator wherein the random numbers are derived from the output of the differencing circuit. It should be noted that in some embodiments, the direct output from the differencing circuit will be processed further before random numbers are obtained.

In an embodiment, the processing circuit outputs an indication on the randomness of the generated random numbers from the estimate of the minimum entropy.

The above apparatus yields as output a set of quadrature values that might be suitable to generate random numbers, according to the state being inputted to generator. In an embodiment, quadrature values cannot be directly used to as random numbers because random numbers are required to be uniformly distributed and unpredictable. In an embodiment, these two conditions can be both met once the quadrature values are properly processed with a randomness extractor algorithm. Then they become usable as random numbers.

Therefore, in an embodiment, the processing circuit comprises a randomness extractor, the randomness extractor being adapted to use the estimated entropy and produce an identically and independently distributed set of said random numbers.

The randomness extractor may be adapted to estimate the fraction of the output from the differencing circuit that needs to be removed to produce random numbers. In an embodiment, the output from the differencing circuit is compressed by the estimated fraction to produce independently distributed random numbers.

In an embodiment, the differencing circuit determines a quadrature measurement of an input signal, wherein the quadrature measurements of the state follow a probability distribution, the processing circuit being adapted to estimate the entropy, from the variance of the probability distribution.

It should be noted that the input signal may be the absence of light.

In an embodiment, the outputs of the of beam splitter are directed towards optical to electric converters. Further, the optical to electric converters can be photodiodes. In further embodiment, they are balanced photodiodes.

The above process enables the measurement of the random quadratures of the electromagnetic field. Such quadratures are measured via a homodyne detection technique.

In the above embodiment, the local oscillator (light source), indicated henceforth as LO, randomly sets its phase between an infinite set of possible values. Thus, there is phase randomisation of the output of the local oscillator, a so-called phase randomization of the LO.

In an embodiment, the apparatus will comprise a laser and suitable electronics to operate the laser in order to achieve the effect of phase randomization of the LO. For example, the first light source may comprise a semiconductor laser diode operated in gain-switch mode such to drive it above and under lasing threshold.

In another embodiment, the light source comprises a semiconductor laser diode configured as a slave light source, the light source possibly further comprising:
  one master light source configured to intermittently generate master light pulses such that the phase of each master light pulse has a random relationship to the phase of each subsequently generated master light pulse, further configured to supply said master light pulses to the slave light source; and
  a controller, configured to apply a time varying drive signal to said at least one slave light source such that just one slave light pulse is generated during each period of time for which a master light pulse is received, such that the phase of each slave light pulse has a random relationship to the phase of each subsequently generated slave light pulse.

In an embodiment, the device regulates the current flowing into the laser such to drive it above and under lasing threshold. In the detail, the electronic system will control the current flow into the laser in order to have each LO emission preceded by an interval of time of sufficient length such to achieve the complete depletion of the laser cavity. The cavity depletion is essential in order to guarantee that each new pulse from the LO has a new random phase. Hence, the electronic driving unit not only will determine the levels of current flowing into the laser, but also the length of the time intervals when the current is injected.

In an embodiment, an analogue to digital converter unit is provided that will continuously sample the current difference signal from the balanced photodiode, denoted henceforth PD, but only the samples acquired when the laser is above threshold, will be used for the random numbers In the above embodiment, regardless of how the randomisation of the phase is achieved, it is possible to measure the quantum state along a different quadrature, such quadrature being randomly determined by the actual random LO phase. A user of the device aims to characterize the entropy content of an unknown state of the electromagnetic field. By measuring the state along many random quadratures, the device produces a set of measurement outcomes. These quadrature values are statistically processed and a value of the min-entropy of the state is evaluated. The user can then use such entropy value and other statistical descriptors to characterize the input state.

In an embodiment, the randomness of the random numbers is independent of the random relationship between the phase of the pulses.

In a further embodiment, a method for measuring an input signal is provided, the method comprising:
receiving an input from a first light source configured to output a sequence of pulses of light, wherein there is a random relationship between the phase of the pulses;
receiving at a beam splitter having first and second inputs and first and second outputs, light pulses from said first light source at the first input and the input signal at the second input;
subtracting signals obtained from the first and second outputs from each other; and outputting a sequence of values corresponding to a sequence of said light pulses from the first light source; and
estimating the minimum entropy of said input signal, from the said sequence of values.

FIG. 1(a) is a simple schematic that summarises the operation performed by the apparatus that will be described in more detail with reference to FIG. 1(b).

In FIG. 1(a), a signal, which is an EM field in an unknown state is input in step S51 into the apparatus in step S53 in an unknown state. It should be noted that the signal might be a null or void signal where light is blocked from entering the apparatus. Such a situation happens where it is attempted to provide a pure vacuum state as an input to the apparatus and the apparatus can be used to determine whether a true vacuum state has been input.

Figure 1B:
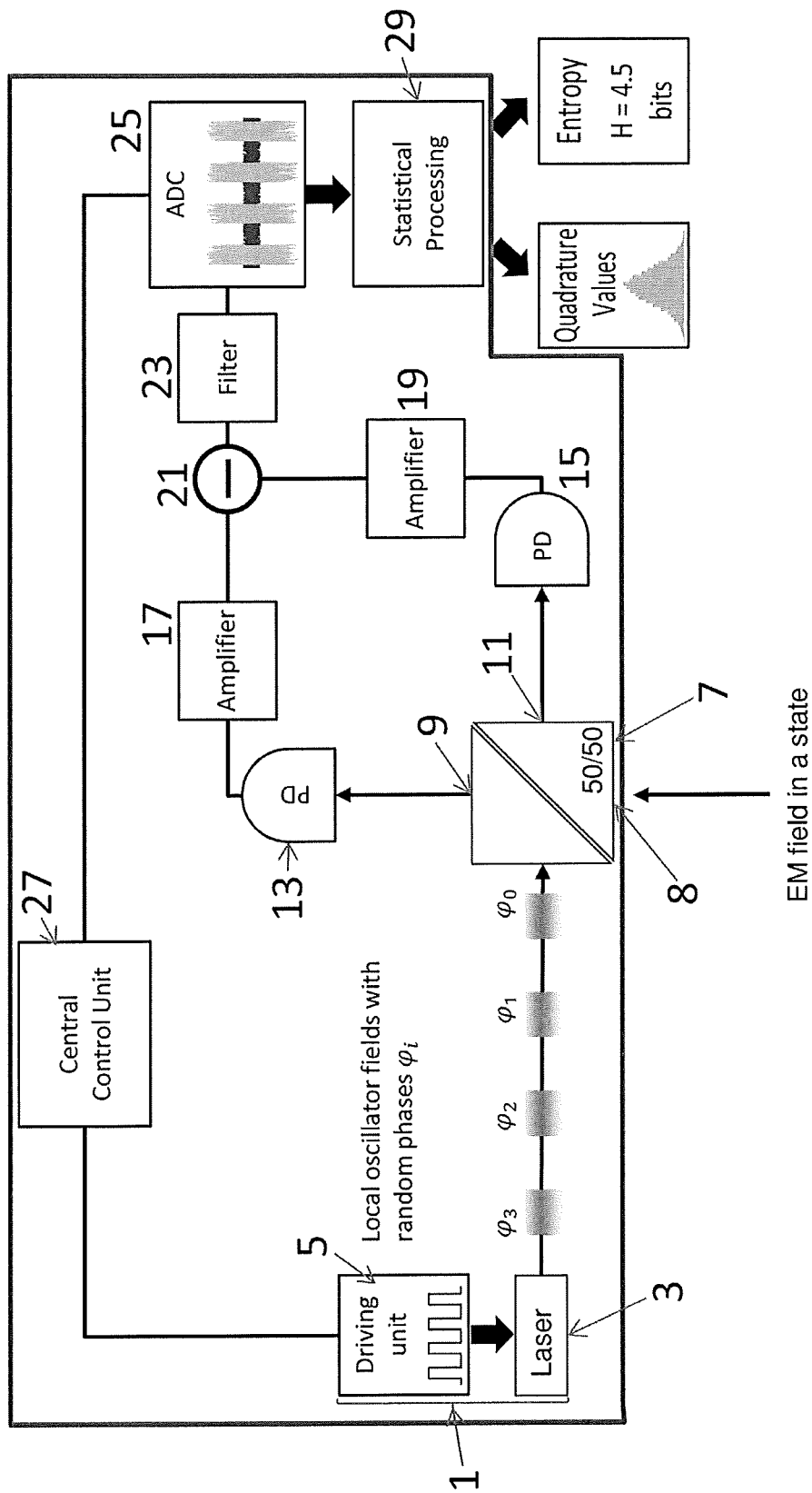
FIG. 1(b) is an example of an apparatus to measure the min-entropy of a state of the electromagnetic field in accordance with an embodiment.

The apparatus, that will be described in more detail with reference to FIG. 1(b) is a minimum entropy measuring unit. This outputs in step S55 and estimate of the minimum entropy of the unknown state and an array of number in step S57.

The apparatus will now be described in more detail with reference to FIG. 1(b).

In FIG. 1(b) a light source 1 is provided. In this embodiment, the light source 1 comprises a laser 3 and a driving unit 5. Details of a possible laser will be described with reference to FIGS. 11 and 12. The laser 3 is controlled by the driving unit 5 such that the first light source 1 outputs local oscillator (LO) fields with random phases $\varphi_i$ when the laser is above its threshold.

The LO fields are received at a first input of a 50/50 beam splitter 7. The second port 8 to the 50/50 beam splitter (BS) 7 receives an input signal which can be described as an electromagnetic (EM) field in a state $|\rho\rangle$. In this embodiment, the state is any state of the EM field entering the second port of the BS 7. Thus, the BS 7 serves to mix the LO field from the first light source and the state of the EM field.

The BS 7 has two outputs 9 and 11. The light signals output from the two outputs from the two arms of the BS 7 are detected by a pair of photodiodes, 13 and 15 which generate two current signals respectively. The pair of photodiodes are so-called balanced photodiodes that, in an embodiment, have the same efficiency.

These currents are amplified by amplifiers 17 and 19. The amplified current signals are then combined in differencing circuit 21 and subtracted from one another to produce a difference current signal. The difference current signal is then filtered by filter 23 and then sampled by an analog to digital converter, ADC 25.

A central control unit 27 is provided that synchronizes the sampling performed by the ADC 25 with the LO emissions from the first light source 1. In an embodiment the sampled data corresponds to the data sampled while the LO is above threshold, For the sampled data where the laser 3 is above its threshold, the data is passed into statistical unit 29 which estimates the entropy associated to the state. In an embodiment, the entropy is estimated using the variance of the data.

The quadrature values and an estimate of the minimum entropy are then output from the statistical processing unit 29.

In the above embodiment, current signals from each PD are subtracted reciprocally, such that the remaining difference current is proportional to the quadrature fluctuations of the field. This randomly varying current is then sampled by means of an analogue-to-digital converter, which converts the electronic noise signal into digital codes. If the input signal is a pure quantum state then these codes are raw random numbers.

The above described apparatus can be used to measure the input signal and more specifically, in accordance with an embodiment, estimate the minimum entropy of the input signal that, in turn, allows the state of the input signal to be characterised. In a further embodiment, the apparatus can be configured as a random number generator as described with reference to FIGS. 1(c) and 1(d).

However, before a discussion of FIGS. 1(c) and 1(d), details of how the above apparatus is used to measure an input signal will be discussed with reference to FIGS. 2 to 10.

Figure 2:
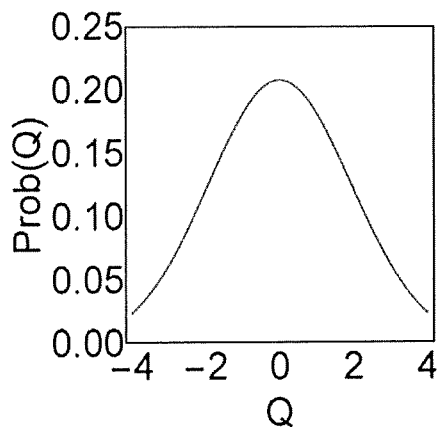
FIG. 2 is a plot of the output of the statistical processing unit of FIGS. 1(b) and 1(d)

FIG. 2 is a schematic of the output of the statistical unit, that shows the distribution of the quadrature measurements. In case a pure vacuum state is inputted in BS 7, integrated over many acquisitions. The output current of the differencing circuit in each acquisition is proportional to the quadrature fluctuations of the pure quantum state injected in the second port of the BS 7.

Figure 3:
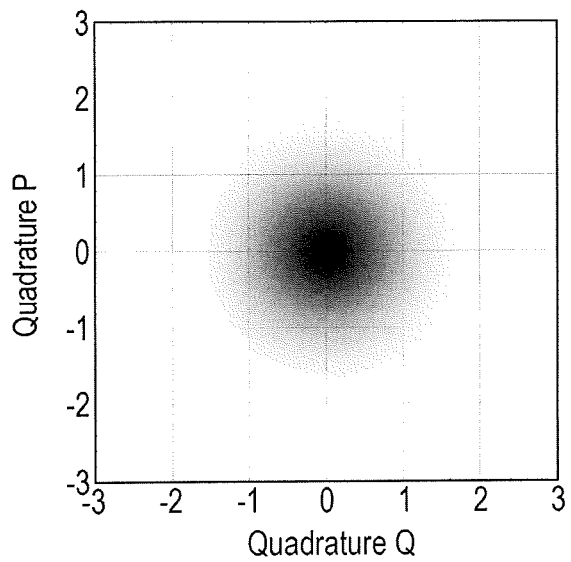
FIG. 3 is a measurement of the EM field of a pure vacuum state.

FIG. 3 shows a measurement of the EM field of a pure vacuum state, the x and y axis denote the quadratures P and Q, where P and Q are the quadratures which represent the real and imaginary parts of the complex amplitude of the field.

Figure 4:
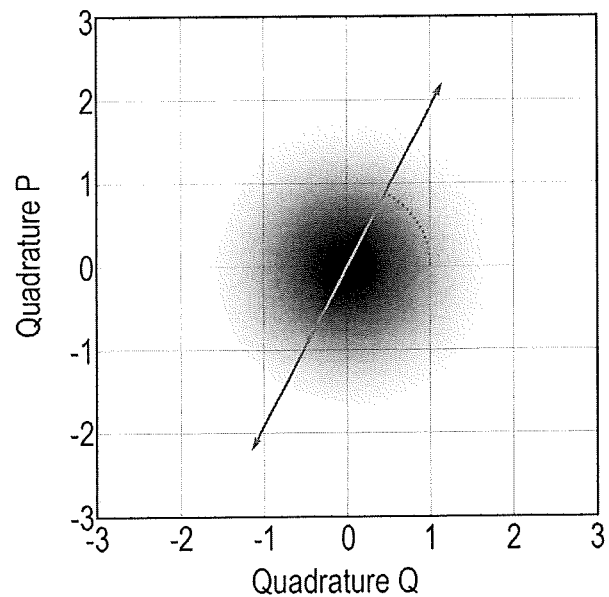
FIG. 4 is a plot showing the measurement of a pure vacuum state and how the homodyne measurement is affected by the phase of the local oscillator.
Figure 5A:
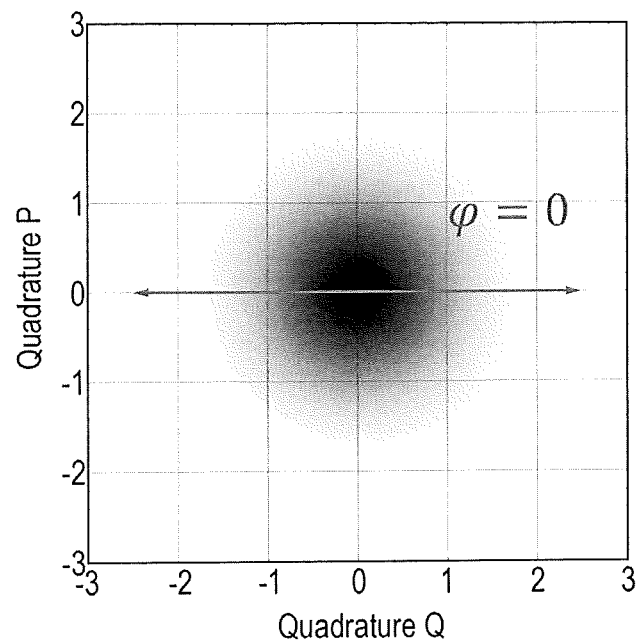
FIG. 5(a) is a plot showing the measurement of a pure vacuum state and how the homodyne measurement is affected by the phase of the local oscillator set to 0°.
Figure 5B:
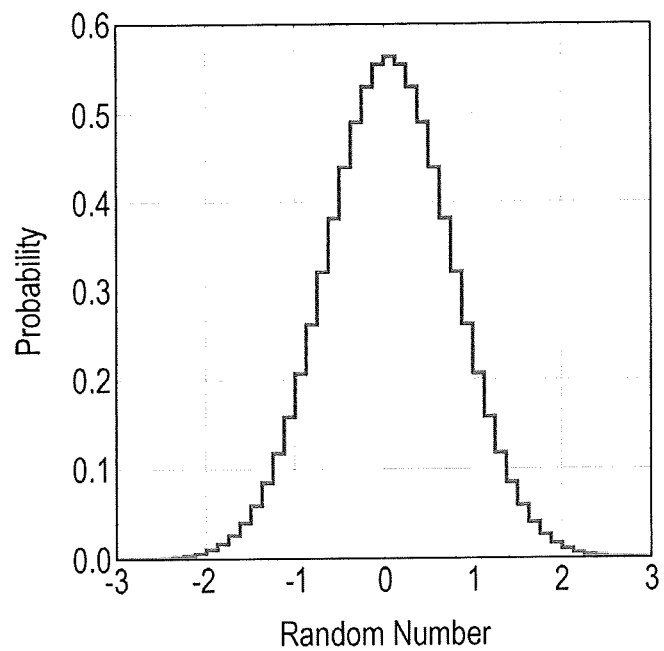
FIG. 5(b) shows a plot of the probability against random number for the measurement shown in FIG. 5(a).

As shown in FIG. 4, the random phase of the local oscillator, i.e. the first light source, selects the quadrature along which the quantum state inputted in the BS is measured. FIG. 5(a) shows the quadratures of the vacuum state as explained with reference to FIG. 3. When the local oscillator phase is zero (i.e. $\varphi=0$), random numbers can be generated along the so-called "position quadrature" (where quadrature P=0). The line on FIG. 5(a) demonstrates the position quadrature. FIG. 5(b) shows a plot of the probability against random number for the position quadrature measurement shown in FIG. 5(a). The random numbers are derived from the oscillation of the difference electric signal from the two photodiodes, which is sampled by the ADC.

Figure 6A:
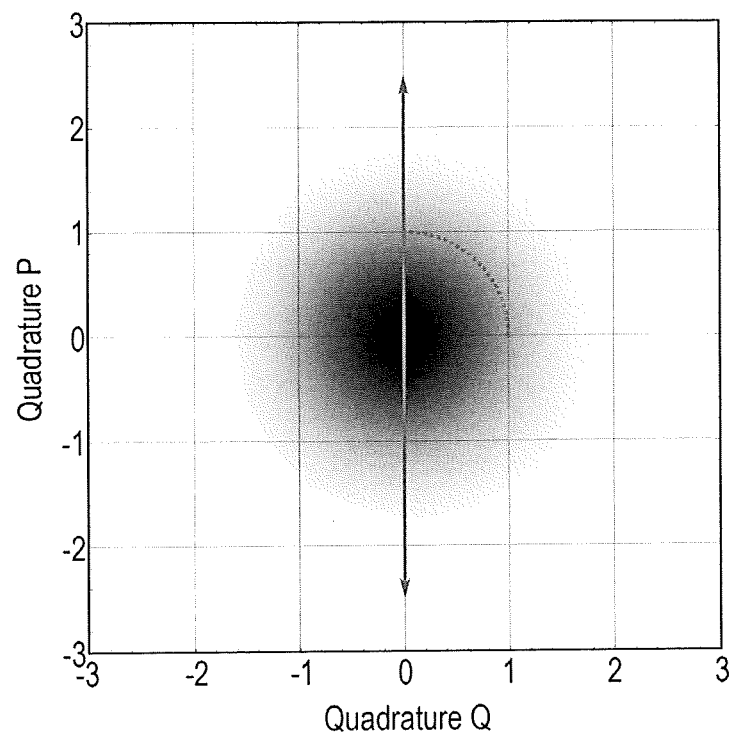
FIG. 6(a) is a plot showing the measurement of a pure vacuum state and how the homodyne measurement is affected by the phase of the local oscillator set to $\varphi=\pi/2$.
Figure 6B:
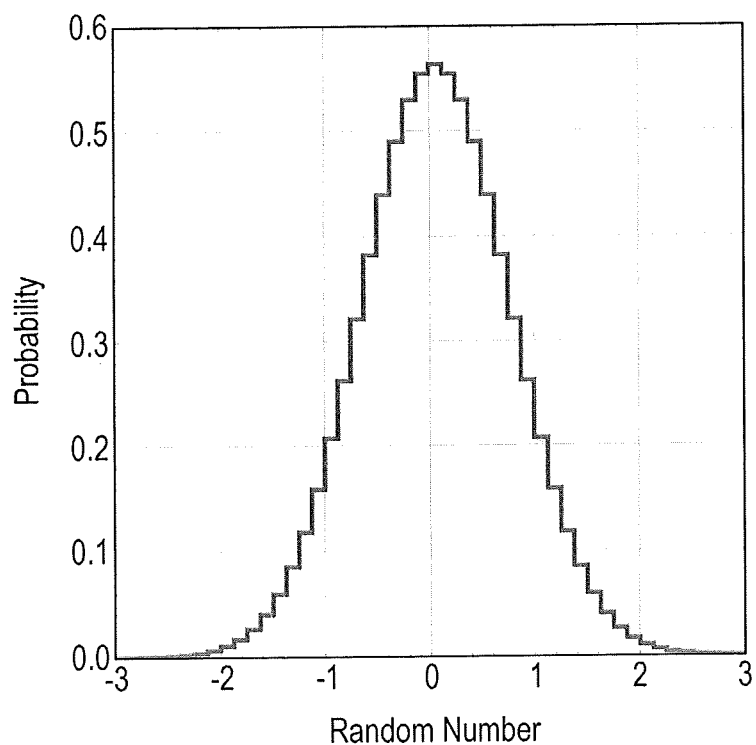
FIG. 6(b) shows a plot of the probability against random number for the momentum quadrature measurement shown in FIG. 6(a)

FIG. 6(a) shows the quadratures of the vacuum state as explained with reference to FIG. 3. When the local oscillator phase is $\varphi=\pi/2$ random numbers can be generated along the so-called "momentum quadrature" (where quadrature Q=0). The line on FIG. 6(a) demonstrates the momentum quadrature. FIG. 6(b) shows a plot of the probability against random number for the momentum quadrature measurement shown in FIG. 6(a). The random numbers correspond to the oscillation of the electric signal difference from the two photodiodes, which is sampled by the ADC.

Figure 7A:
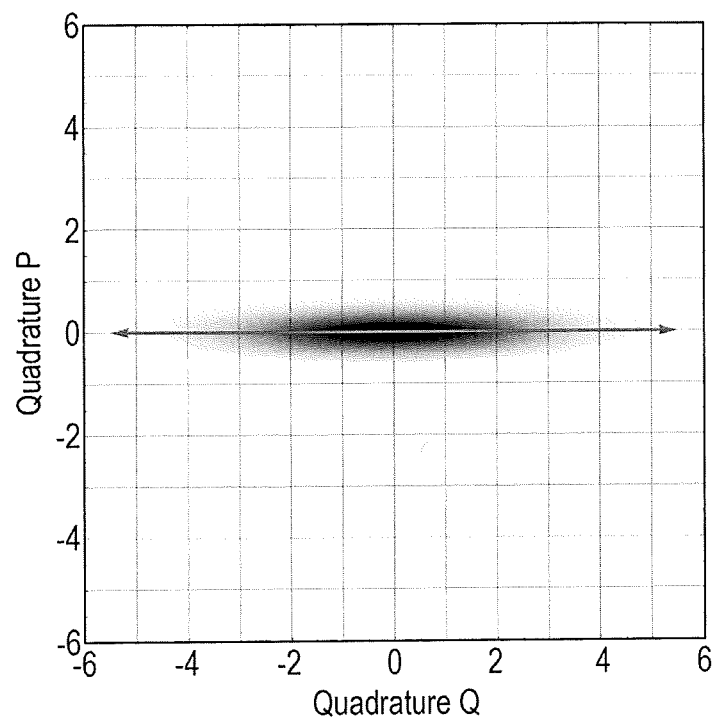
FIG. 7(a) is a plot showing the measurement of a squeezed state and how the homodyne measurement is affected by the phase of the local oscillator set to 0°.
Figure 7B:
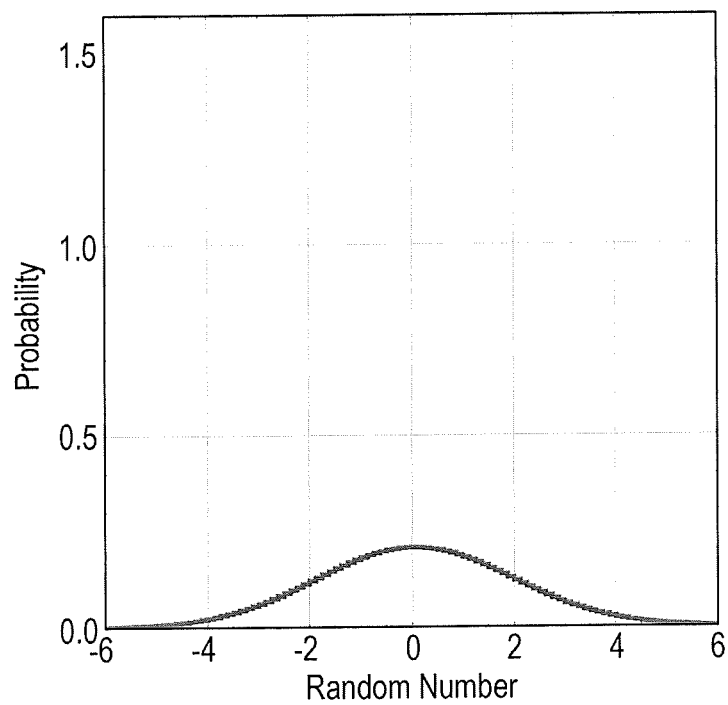
FIG. 7(b) shows a plot of the probability against random number for the measurement shown in FIG. 7(a)

FIG. 7(a) shows a possible input quantum state to the beam splitter and FIG. 7(b) shows the probability distribution of the position quadrature of the state of FIG. 7(a).

According to the shape of the quantum state and according to the LO phase it is possible to obtain different random number distributions. In the example of FIG. 7(a), a P-squeezed state is measured along the anti-squeezed quadrature Q. The random distribution shown in FIG. 7(b) is very broad.

Figure 8A:
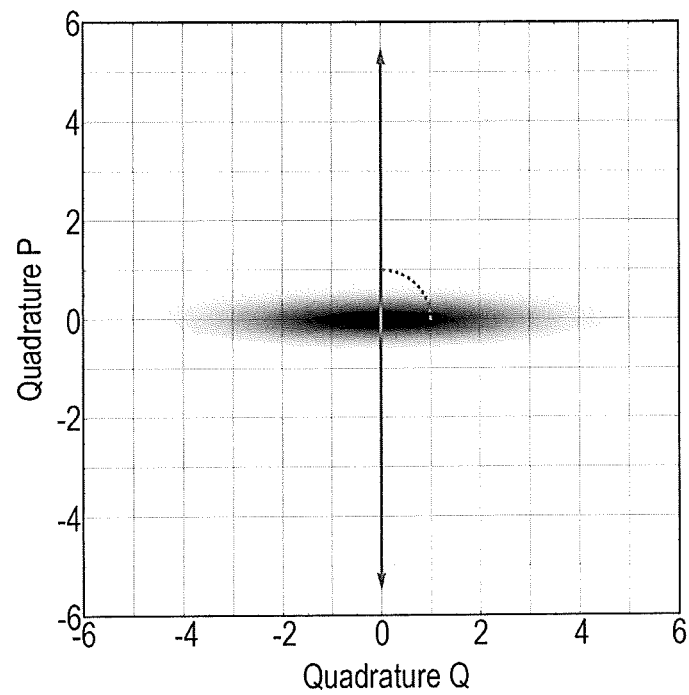
FIG. 8(a) is a plot showing the measurement of a squeezed state and how the homodyne measurement is affected by the phase of the local oscillator set to $\varphi=\pi/2$.
Figure 8B:
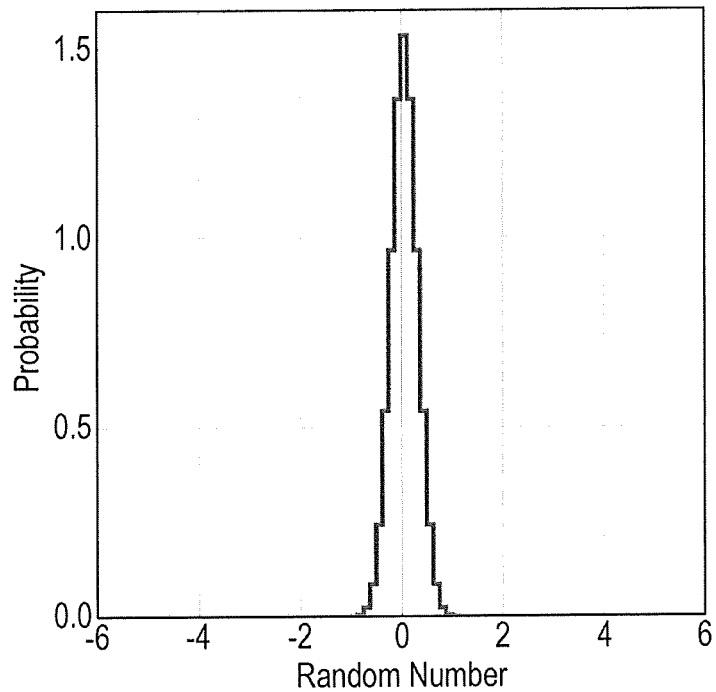
FIG. 8(b) shows a plot of the probability against random number for the momentum quadrature measurement shown in FIG. 8(a)

However, FIG. 8(a) shows the same P-squeezed state, but FIG. 8(b) shows the probability distribution along the along the squeezed quadrature P. Here, the number distribution is very narrow.

This ability to affect the probability distribution of the random numbers can allow an adversary to exhibit some control of the random numbers and therefore this can make the system unsecure.

Figure 9A:
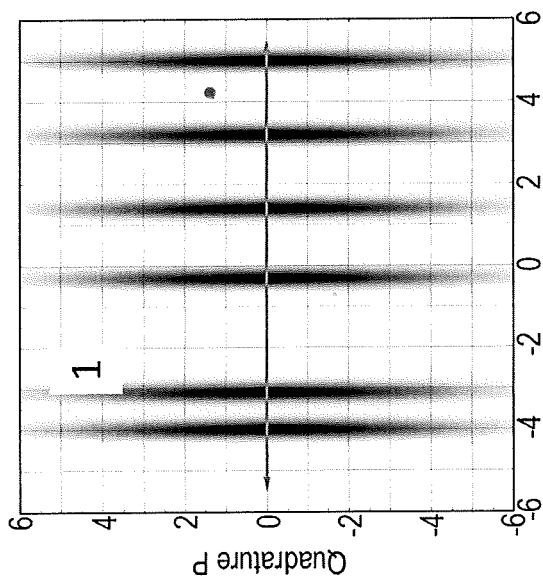
FIG. 9(a) shows a potential form of a forged state made up by displaced squeezed states.
Figure 9B:
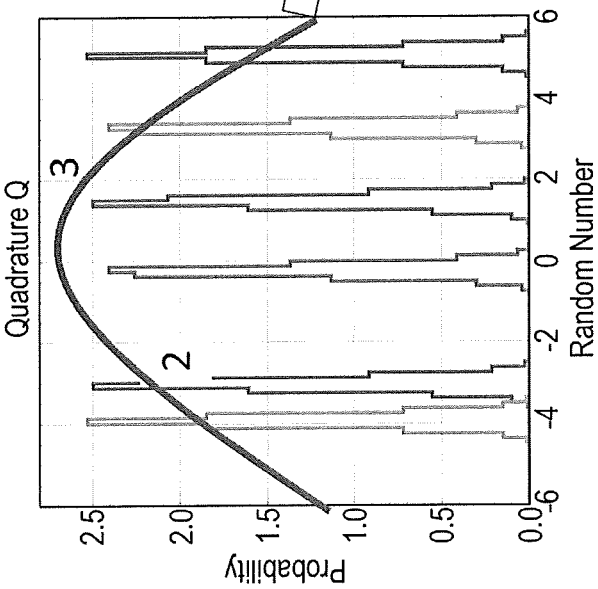
FIG. 9(b) shows the random number distribution for each squeezed state shown in FIG. 9(a) and FIG. 9(c) shows the total distribution for the squeezed states.
Figure 9C:
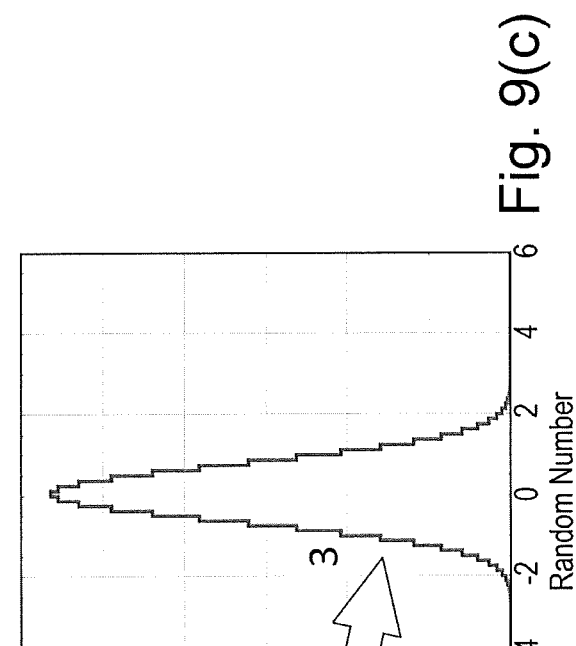

For example, FIG. 9(a) shows a potential form of a forged state made up by displaced squeezed states, which an adversary might sequentially input through the second input to the 50/50 beam splitter 7 FIG. 1. FIG. 9(b) shows the random number distribution for each squeezed state shown in FIG. 9(a). Each distribution is very narrow such that the adversary can guess with high confidence the random number generated at each round. The adversary inputs these squeezed states in calibrated proportions such that, from the expected distributions shown in FIG. 9(b), the total distribution measured yields a specified shape as shown in FIG. 9(c). Therefore the adversary can control the states sent such that the authorised user detects random numbers with the expected probability distribution as if the generator was operating well without the presence of an adversary. However, the adversary has controlled the input quantum state and has controlled what the authorised user detects as individual random numbers. Thus, the adversary is able to control the random number generator without being noticed by the legitimate user.

However, the system that has been described with reference to FIGS. 1(a) to 1(d) can prevent an adversary obtaining information in this way as the phase of the local oscillator is randomised.

FIG. 10(a) shows the same pattern of states that the adversary plans to send as shown in FIG. 9(a). However, the phase of the local oscillator is varied and this has the effect of measuring the quadrature in a randomly varying direction. In other words, if the legitimate user randomly changes the phase of the LO, the squeezed states are measured along random quadratures. In this way, the adversary guesses with less confidence the output of the measurements as shown in FIG. 10(b). In addition, the final distribution is larger with respect to the expected one as shown in FIG. 10(c). In this way the user spots the presence of the adversary and can take action to prevent the use of the resulting numbers, which are not provably random.

Thus, the system of FIG. 1 provides a system that avoids the above attack by an adversary.

The above description shows that it is possible to measure the quantum state along a different quadrature, such quadrature being randomly determined by the actual random LO phase. Thus, the above arrangement can be used to characterize the entropy content of an unknown state of the electromagnetic field. By measuring the state along many random quadratures, the device produces a set of measurement outcomes. These quadrature values are statistically processed and a value of the min-entropy of the state is evaluated. The user can then use such entropy value and other statistical descriptors to characterize the state of the input signal.

In an embodiment, it is possible to obtain such measurement of entropy in consecutive steps:

1. An unknown state $\rho_E$ of the electromagnetic field is inputted in the apparatus setup;
2. The apparatus performs on this state N phase-randomized quadrature measurements outputting the corresponding phase randomized quadrature values $x_i$ with $i \in \{1, \ldots, N\}$;
3. One exploits a first result of Quantum Optics, which states that such phase randomized quadrature values have a probability distribution $X(\rho_E)$ is the same one would have obtained if the input state was a "phase randomized state" and the measurement had been performed on a single quadrature;
4. One exploits two additional results of Quantum Optics:
   a. A phase randomized state can written as a linear combination of photon number state, $\rho_E = \Sigma_n p_n |n\rangle\langle n|$, where the coefficients $p_n$ are the probabilities of a given photon number probability distribution P(n) and $|n\rangle\langle n|$ are the photon number states. For example, if the input state is a coherent state, P(n) is the Poisson distribution, if the input state is a thermal state, P(n), is the geometric distribution.
   b. The photon number probability distribution P(n) of a state is the same before and after the phase randomization.
5. These results implies that the overall distribution of the measured quadrature values is equivalent to a linear convex combination $X(\rho_E) = \Sigma_n p_n X(|n\rangle\langle n|)$, where $X(|n\rangle\langle n|)$ is the distribution of the quadrature measurement of the photon number state $|n\rangle\langle n|$.
6. One exploits result of Statistics, which states that the variance of $X(\rho_E)$, i.e., $\sigma_{X(\rho_E)}^2$, is given as a linear convex combination of the quadrature distribution variances of the photon number states $\sigma_{X(|n\rangle\langle n|)}^2$, i.e. $\sigma_{X(\rho_E)}^2 = \Sigma_n p_n \sigma_{X(|n\rangle\langle n|)}^2$
7. Hence by running a linear optimization with the constraint that $\Sigma_n p_n = 1$ one can find the coefficients $p_n$.
8. These coefficients allow reconstructing the unknown input state in terms of photon number states. Large coefficients for low photon number state, e.g. $|0\rangle\langle 0|$ or $|1\rangle\langle 1|$, imply that the input state is mostly quantum. Otherwise, if the coefficients for high photon number state are large, the input state is mostly classical.
9. The knowing of the coefficients enables one to estimate the maximal amount of quantum uncertainty that can be associated to the quadrature measurement $H_{min}(X|E)$, i.e., the min entropy of X. The more the input state is quantum, the larger is the value of $H_{min}(X|E)$. At the limit, for a classical input state $H_{min}(X|E)$ is null.

Returning now to FIG. 1(c), as described above, in an embodiment, the apparatus of FIGS. 1(a) and 1(b) are configured as a random number generator.

Figure 1C:
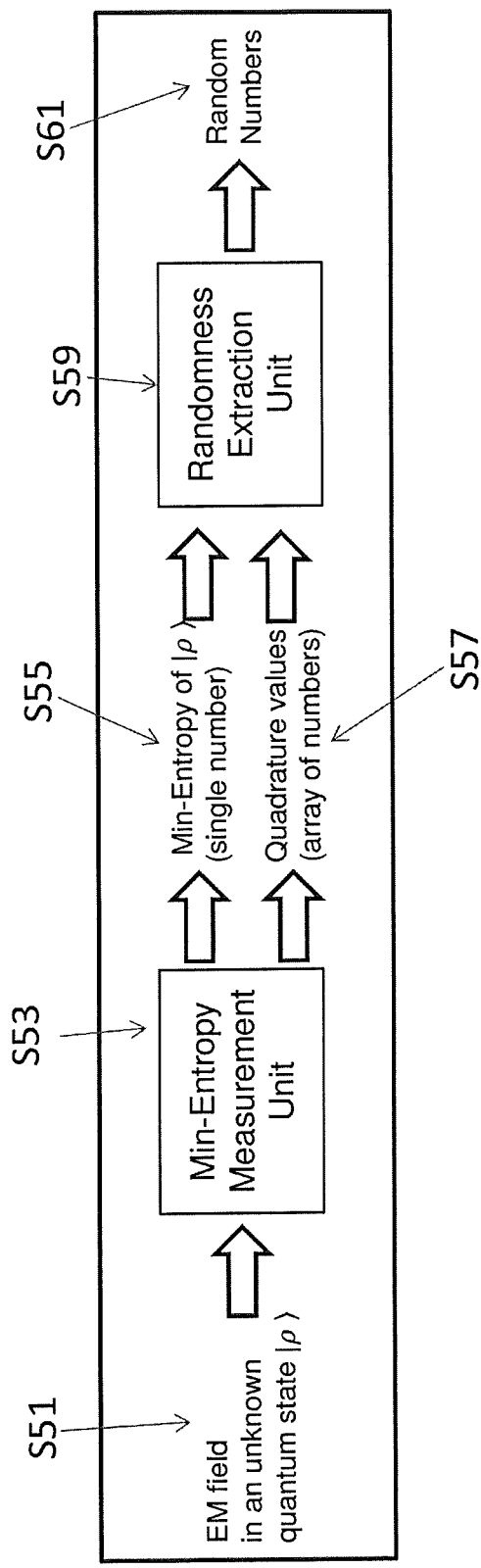
FIG. 1(c) is a block/flow diagram of a random number generator obtained by inputting the output of the device of FIG. 1(a) into a randomness extractor unit.

The basic process performed by the random number generator are shown in FIG. 1(c). To avoid unnecessary repetition, like reference numerals will be used to denote like features with that of FIG. 1(a).

In FIG. 1(c), the minimum entropy of the input state and the quadrature values are provided to the randomness extraction unit S59. From this, random numbers are output in step S61.

Figure 1D:
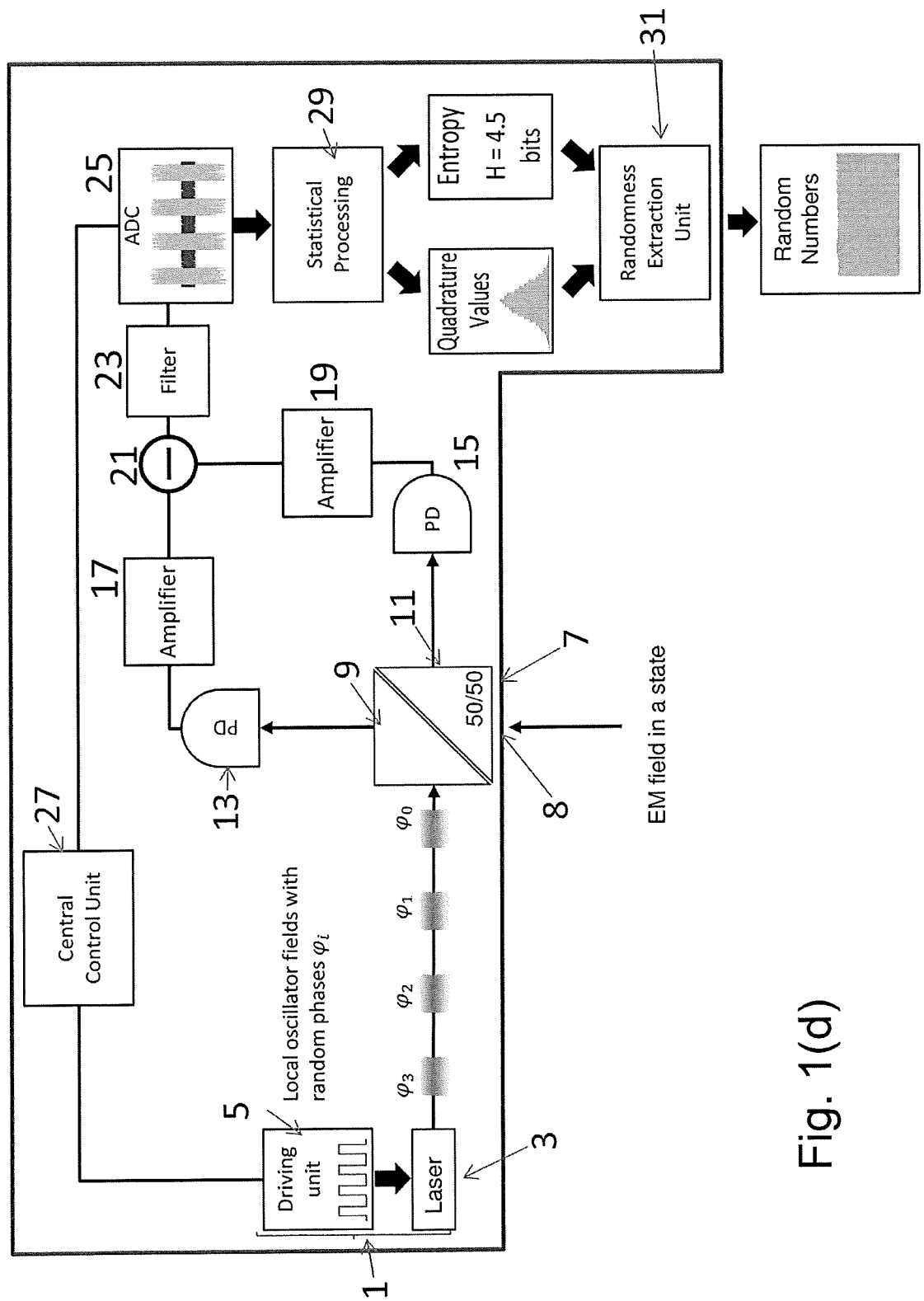
FIG. 1(d) is an example of a random number generator in accordance with an embodiment.

Referring now to FIG. 1(d), to avoid unnecessary repetition, like reference numerals will be used to denote like features with that of FIG. 1(b). In FIG. 1(d), the minimum entropy of the input state and the quadrature values output from the statistical processing unit 29 are directed through a randomness extractor 31 to make the number identically and independently distributed. Eventually these numbers are emitted by the generator.

The randomness extraction unit, indicated henceforth as REU 31, which takes as input the outputs from statistical processing unit 29 and yields identically and independently distributed random numbers. Considering the sequence of collected quadrature values as a bit string, the task of the REU 31 is to statistically remove the fraction of bits that are predictable.

The fraction of bits that has to be removed is provided by the other output of the statistical processing unit 29, i.e., the min-entropy. For example, if each quadrature sample is encoded in a digital word of eight bit (corresponding to the resolution of the sampling unit) and the value of min-entropy outputted by the apparatus is of 6 bits, the REU will statistically remove the 25% of the bits making the original string of quadrature values. Given that the value of min-entropy obtained with the phase randomization, corresponds to the maximal amount of bits that can be extracted per measurement unpredictable in sense of quantum mechanics, the output string of REU 31 is completely unpredictable.

The advantage of using REU 31 in a random number generator will be explained in the following with an operative example. Let's assume that a party called Alice wants to organize a lottery game for which she needs to generate some random numbers. Alice then builds a typical homodyne CV-QRNG that measures just a single quadrature of the electromagnetic field. The state of the field Alice input is the "vacuum", i.e., no light since Alice knows that this pure state of the field provides numbers that are unpredictable in sense of quantum mechanics. Given that the vacuum quadrature values have a Gaussian distribution, Alice applies a weak classical processing to transform the unpredictable quadrature values into unpredictable and uniformly distributed numbers for the lottery.

Let's assume that another party, called Eve, wants to win the lottery game by cheating, i.e., by conditioning the output of the typical homodyne CV-QRNG of Alice. For this purpose, Eve starts to input light signals to the generator, instead of Alice's vacuum state. Eve could also elaborate a subtle attack strategy by inputting highly engineered states, such that if Alice checks the probability distribution of quadrature measurements, she still finds the Gaussian distribution she was expecting to measure for the vacuum state. In this scenario, the fixed quadrature homodyne measurement generates partially or fully predictable (by Eve) values. After Alice's weak classical processing these values become predictable and uniformly distributed numbers. In this way Eve has very high chances to win the lottery without Alice being aware of the cheating.

However, if Alice builds an RNG with REU 31, Eve won't be able to have any guessing advantage. In fact, whatever cheating strategy Eve adopts, the RNG with REU 31 will just output unpredictable numbers. At the limit, if Eve resolves herself to input a classical state, i.e., a state of the field without any exploitable randomness, the RNG with REU 31 won't output any number.

In an embodiment, the randomness extraction algorithm is a two universal hash function. Said function takes as first input the bit string corresponding to the digital representation of the quadrature value samples from processing unit 29. Said function takes as second input the entropy value from the processing unit. Said function outputs a string of identically and independently distributed bits, which is shorter with respect to the input one by a factor determined by the min-entropy.

The apparatus described above enables generation of random numbers at high rate due to the fluctuations of the quadrature observable of the EM field of the quantum state injected in the BS 7. The above apparatus allows these fluctuations to be measured using random quadratures in a homodyne detection technique.

The laser can be randomly switched to output signals with randomly different phases using a number of different techniques. In one embodiment, the signal is outputted by a laser configured to operate in a slave mode following seeding by a master, such a laser can be a so-called gain-switched laser.

FIG. 11(*a*) shows a schematic illustration of a gain-switched laser. A gain-switched laser generates light when the laser is switched above the lasing threshold and generates almost no light when the laser is switched below the lasing threshold. Laser 140 has a controller 141 which modulates the gain of the laser by modification of the pump power. The gain is modulated in a time varying manner, and may be modulated in a periodic manner. Driving the laser in this manner generates laser pulses at the laser output 142. The laser pulses may be of the order of picoseconds in duration.

If laser 140 is a semiconductor laser then it can be pumped electrically, by applying a current or voltage. In order to modulate the gain of a semiconductor laser, the controller 141 modulates the current or voltage applied to the laser.

If laser 140 is a fiber laser or solid state laser, it can be pumped optically. In order to modulate the gain of a fiber laser or solid state laser the controller 141 modulates the optical input applied to the laser.

FIG. 11(*b*) shows three graphs illustrating a gain modulation of a semiconductor gain-switched laser. The upper graph shows the current applied to the laser on the vertical axis, with time on the horizontal axis. The DC bias is indicated by a horizontal dotted line. The current applied to the laser has the form of a series of current modulation pulses. The wave in this case is a square-type waveform. A different gain modulation signal can be used, for example a sine wave, or a non-periodic time varying signal. In this case, the current is not reduced to zero in between the current modulation pulses, but only reduced to a bias value (which is indicated by the dotted line).

The current modulation signal is applied to the laser and switches the gain of the laser above and below the lasing threshold periodically. The second graph shows the carrier density of the laser on the vertical axis, against time on the horizontal axis. The lasing threshold is indicated by a dashed horizontal line. When a current modulation pulse is applied to the laser, the injected carriers increase the carrier density and the photon density increases.

The laser output generated by the modulation signal is shown in the lower graph. The vertical axis shows the laser intensity, with time on the horizontal axis. The laser outputs light when the carrier density is above the lasing threshold. Photons generated by spontaneous emission inside the laser cavity are amplified sufficiently by stimulated emission to generate an output signal. The length of the delay between the application of the current modulation pulse and the generation of the output light depends on several parameters, such as the laser type, cavity length and pumping power.

The rapid increase of the photon density causes a decrease in the carrier density. This in turn decreases the photon density, which increases the carrier density. At this point the current modulation pulse is timed to switch back down to the DC bias level, and the laser emission dies off quickly. The laser output therefore consists of a train of short laser pulses as shown in the lower graph.

To generate longer pulses, the gain bias is chosen to be closer to the lasing threshold. This means that the carrier density crosses the lasing threshold earlier, which gives the light pulse more time to evolve. Initially the light intensity will overshoot and quickly reduce the carrier density. This in turn causes the photon density to decrease and the carrier density to increase, in turn increasing the light intensity. This competing process causes oscillations of the light intensity at the beginning of the pulse which are strongly damped, leading quickly to a steady-state where the intensity is constant. The oscillations are called relaxation oscillations. The laser pulse ends when the current pulse ends and switches the current to the bias value again.

FIG. 11(c) shows a schematic illustration of an electrical driving circuit for a semiconductor gain-switched laser. The semiconductor gain-switched laser is laser diode 145. The cathode of laser diode 145 is connected to bias-T 146 comprising inductor 147 and resistor or capacitor 148. These components make up a gain modulation unit for the semiconductor laser diode 145. Via inductor 147 a DC bias current is sent through the laser diode. This provides the gain bias (the minimum level of the current indicated by the dotted line in FIG. 11(b)). Via resistor or capacitor 148 an AC modulation current is sent through the laser diode, providing the gain modulation needed for gain-switching the laser above and below the lasing threshold.

A gain switched laser can generate phase-randomised light pulses. The light pulses exhibit time jitter.

Figure 12:
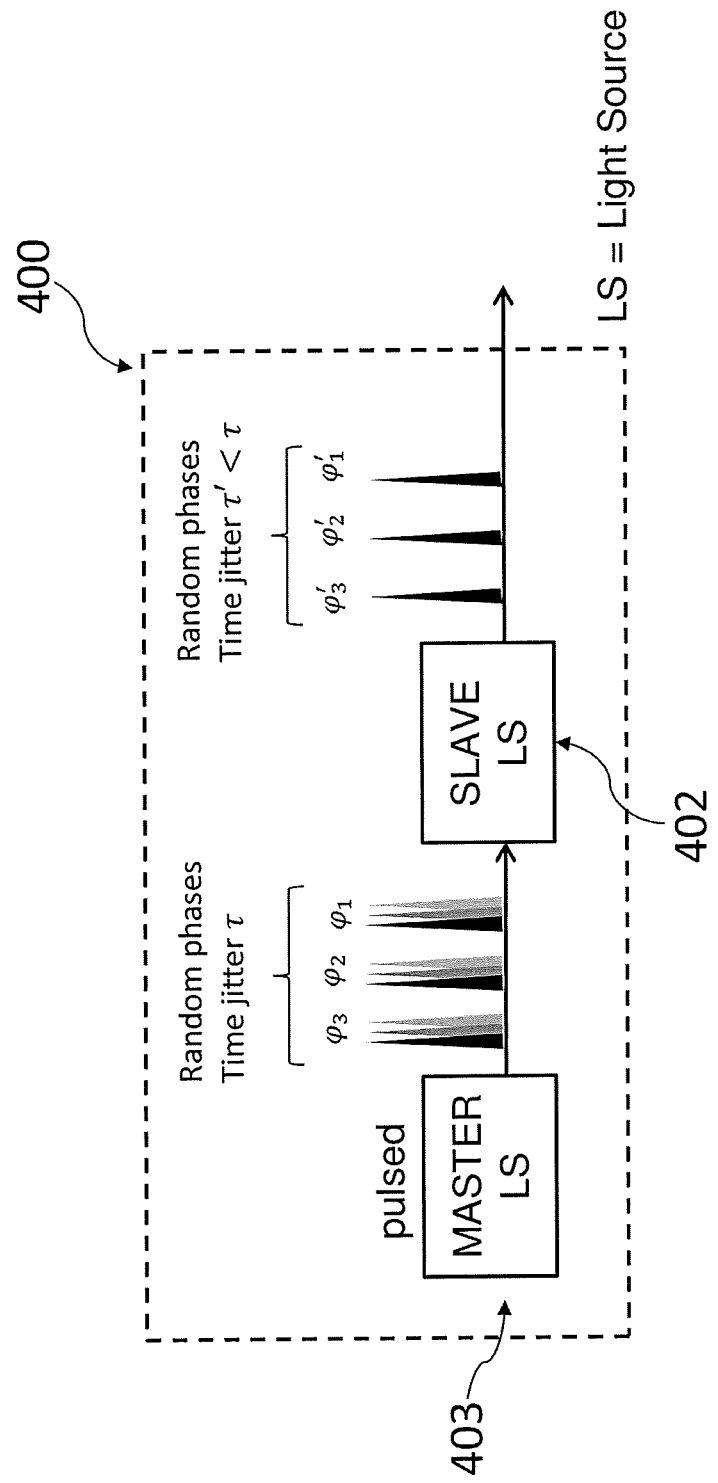
FIG. 12 is a schematic illustration of a phase-randomised light source 400 that can be used in an interference system in accordance with an embodiment.

FIG. 12 is a schematic illustration of a phase-randomised light source 400 that can be used in an interference system in accordance with an embodiment. The light source works on the mechanism of pulsed and phase-randomised seeding.

The pulsed master light source 403 can be a gain-switched semiconductor laser as described in relation to FIG. 11. A controller (not shown) drives the master light source 403 such that it generates pulses of light, for example as described above in relation to FIG. 11.

The master light source 403 emits light pulses having a random phase relationship. This means that the phase of each light pulse emitted from the master light source has a random relationship to the phase of each subsequent light pulse. The master light pulses are injected into the slave light source 402. The slave light source 403 can be a gain-switched semiconductor laser as described in relation to FIG. 11. A controller (not shown) is configured to apply a periodic signal to the slave light source so that one light pulse is generated during each period of time for which a master light pulse is injected. Each generated slave light pulse has a fixed phase relation to the injected master light pulse.

Although the phase of the master light pulses is described as being random, in practice there might be a finite amount of correlations between the phases of two light pulses emitted in quick succession. By describing the phase difference as random, it is meant that these correlations are small and decay rapidly. In one embodiment, there are no measurable correlations for two light pulses that are emitted 400 ps apart. In one embodiment, there are no measurable correlations for two light pulses that are emitted ins apart. In one embodiment, there are no measurable correlations for two light pulses which are emitted 10 ns apart. In one embodiment, there are no measurable correlations for pulses emitted 100 ns apart.

Not all light sources produce pulses with a random phase relationship. A mode-locked pulsed laser for example cannot produce pulses having a random phase relationship. Specific driving conditions for the master light source 403 can be used in order for a random phase relationship to occur between the generated master light pulses. For example, a semiconductor gain switched laser can produce pulses having a random phase relationship if the empty cavity condition is met. This is explained in more detail below.

The random nature of the phase of each light pulse generated arises because each light pulse is initiated through spontaneous emission. Spontaneous emission can be ascribed to the vacuum fluctuations of the optical field. In a gain-switched laser diode, spontaneous emission influences the electromagnetic phase of each generated pulse. When the laser cavity is empty, i.e. in the vacuum state, prior to lasing the lasing action is triggered entirely by spontaneous emission. Spontaneous emission inherits its electromagnetic phase from the vacuum, the phase of which is totally unbiased and random.

The empty cavity condition can be reached when cavity photons have a sufficient time to decay prior to each lasing event. For example, when a laser diode is gain-switched with a 2.5 GHz square wave, the average residual photon number of the cavity before the generation of each pulse is $10^{-10}$. This intensity is orders of magnitude weaker than the spontaneous emission. In one embodiment, when the master light source is under a driving frequency of less than or equal to 4.0 GHz, each master light source pulse will have a random electromagnetic phase.

The controller is thus configured to drive the master light source such that there is sufficient time for residual cavity photons to decay between each lasing event that the master light pulses are initiated through spontaneous emission instead of residual cavity photons. In one embodiment, the controller is configured to drive the master light source with a time varying current or voltage having a frequency of less than or equal to 4.0 GHz. In one embodiment, the controller is configured to drive the master light source with a time varying current or voltage with a frequency of less than or equal to 2.5 GHz. In one embodiment, the time gap between each generated master light pulse is greater than or equal to 125 ps. In one embodiment, the time gap between each generated master light pulse is greater than or equal to 200 ps.

The master light source 403 is connected to a first aperture of a slave light source 402 by a waveguide, for example an optical fibre. A second waveguide, for example an optical fibre is connected to a second aperture of the slave light source 402. Alternatively, the light pulses may travel between the components of the phase randomised light source 400 through free space (meaning that no waveguides are required to connect the components such as the master light source 403 and the slave light source 402).

The slave light source 402 may also be a gain-switched semiconductor laser as described in relation to FIG. 11. Alternatively, the slave light source 402 can be any type of light source that generates pulses of coherent light. A controller (not shown) drives the slave light source 402 such that it generates pulses of light, for example as described above in relation to FIG. 11. A single controller may drive both the slave light source and the master light source. Alternatively, a separate controller may drive each light source.

Master light source 403 generates a sequence of light pulses which are referred to as master light pulses. The phase of each master light pulse has a random relationship to the phase of each subsequently generated master light pulse. In FIG. 12, the master light source 403 produces a train of pulses with random electromagnetic phases $\varphi_1$, $\varphi_2$, $\varphi_3$, . . . , and a large time jitter τ represented by the triplets of pulses. The triplets of pulses represent that fact that the light pulse could have been emitted at the time of the first, second, or third triplet pulse, and it is not known at which time it is emitted. The master pulses are then injected as "seeds" into the slave light source 402, leading to pulsed injection seeding.

In other words, the master light pulses are emitted from the master light source 403 into the waveguide, and enter slave light source 402 through the first aperture. Light from master light source 403 enters the optical cavity of the slave light source 402 and causes pulsed injection seeding of the slave light source 402. The term pulsed injection seeding can refer to laser seeding, or seeding by a light source other than a laser. Slave light pulses are generated through pulsed injection seeding and are emitted from a second aperture of the slave light source 402.

The random phase relationship of the master light pulses means that each slave light pulse will also have a random phase with respect to each subsequently generated slave light pulse. When pulsed injection seeding occurs, each time the slave light source 402 is switched above the lasing threshold, the generated slave light pulse has a fixed phase relation to the injected master light pulse. As only one slave light pulse is generated for each injected master light pulse, each slave light pulse has a random phase relationship to each subsequently generated slave light pulse (because each master light pulse has a random phase relationship to each subsequently generated master light pulse).

In order for pulsed injection seeding to occur, the frequency of the injected master light pulses must match the frequency of the slave light source 402 to within a certain range. In one embodiment, the difference in the frequency of the light supplied by the master light source 403 and the frequency of the slave light source 402 is less than 30 GHz. In some embodiments, where the slave light source 402 is a distributed feedback (DFB) laser diode the frequency difference is less than 100 GHz.

For successful pulsed injection seeding the relative power of the master light pulses that enter the optical cavity of the slave light source 402 has to be within certain limits which depend on the type of light source that is used. In one embodiment, the optical power of the injected master light pulses is at least 1000 times lower than the optical output power of the slave light source 402. In one embodiment, the optical power of the injected master light pulses is at least 100 times lower than the optical output power of the slave light source 402. The master light source 403 can comprise a fixed optical attenuator that reduces the intensity of the master light pulses emitted. Alternatively, the master light source 403 can comprise an adjustable optical attenuator that is adjusted only slowly. The intensity of the generated slave light pulses depends on the intensity of the master light pulses. Indeed, with the correct driving conditions, no slave light pulses are generated at all if no master light pulses are injected. The master light source 403 can comprise an intensity modulator that varies the intensity of the generated master light pulses before they are supplied to the slave light source 402, in order to vary the intensity of the generated slave light pulses. The phase-randomised light source 400 can comprise a second optical attenuator that reduces the intensity of the slave light pulses generated by the slave light source 402 or an intensity modulator that varies the intensity of the slave light pulses generated by the slave light source 402.

In one embodiment, slave light source 402 and master light source 403 are electrically driven, gain-switched semiconductor laser diodes. In one embodiment, the slave light source and master light source have the same bandwidth. In one embodiment, both light sources have a bandwidth of 10 GHz. In one embodiment, both light sources have a bandwidth of 2.5 GHz. Here, the bandwidth means the highest bit rate achievable with the gain-switched laser diode under direct modulation. A laser of a certain bandwidth can be operated at a lower clock rate.

A light source, for example a gain-switched laser, referred to as a master light source, produces a train of phase randomised light pulse with time jitter $\tau$ and seeds a second light source, which may also be a gain switched laser, referred to as a slave light source, which produces a train of phase randomised light pulses with time jitter $\tau'<\tau$.

The master light source generates phase-randomised light pulses that are injected into the slave light source. This reduces the time jitter of the pulses emitted by the slave light source, relative to the time jitter of pulses emitted by the slave light source without master light pulses being injected. The generated slave light pulses are phase randomised. For a reduction of the time jitter, the light from the master laser must be in the cavity of the slave laser before the slave laser gain increase is activated. Thus when the slave laser gain modulation signal is switched on, or increased above the lasing threshold, the light from the master laser has been generated already. The travelling time of the light from the master laser to the slave laser is negligible.

Reducing the time jitter of the slave light pulses before they are used in an interference apparatus means that the interference visibility is increased. For example, if the slave light pulse is a gain-switched laser which produces pulses with full width at half maximum (FWHM) of 35 ps with a r.m.s. time jitter around 7 ps, the time jitter is about 20% of the FWHM. It can be shown in simulation that such a time jitter may reduce visibility of an interference experiment to less than 90%, regardless of the specific bandwidth considered. A direct measurement using a laser, photodiode and oscilloscope shows that the time jitter can be reduced by a factor of up to 6 by seeding the slave light source with a master light source.

For completeness, one method for determining the random numbers from the raw numbers will be described below. However, other methods are also possible.

The secure generation rate of any QRNG is given by the conditional min-entropy $H_{min}(X|E)$, which represents the minimum uncertainty the adversary has on the random string X generated by the QRNG or, equivalently, the maximum number of unpredictable bits conditional on the adversary's side information E. This quantity is usually difficult to calculate, due to the condition on E, which describes any possible attack by the adversary on the QRNG.

If there is no adversary, the previous quantity becomes the min-entropy $H_{min}(X)$, which is easy to calculate as it only depends on the statistics of the variable X.

The CV-QRNG is secure whenever adversary inputs the vacuum state. In fact, inputting the vacuum state is equivalent to having no adversary on the input port. This means that it is always possible to write $$H_{min}(X|E) \geq p_0 H_{min}(X)$$

where $p_0$ is a lower bound to the fraction of times where adversary inputted the vacuum state. Hence the problem is turned into finding $p_0$. This can be solved by noting that the phase-randomisation of the local oscillator (LO) is equivalent to having a stable LO on one input of the BS and the random phase modulation on the adversary's input of the BS. This equivalence implies that the most general state the adversary can input into the BS is given by $$\rho_E = \Sigma_n p_n |n\rangle\langle n|,$$

where $|n\rangle\langle n|$ is the number state and $p_n$ is the probability that the adversary prepares it.

From here, $p_0$ can be bounded from the experimental data. For instance, if the variance of the number states in Eq. (2) is considered, it is possible to determine that it amounts to ½ for the vacuum state $|0\rangle\langle 0|$, to 3/2 for the state $|1\rangle\langle 1|$ and so on. Therefore if the experimental variance is smaller than 3/2 it can be derived that $p_0 > 0$.

An Example

After sampling the output of the homodyne detector, one can convert the ADC 256 digital values into quadrature units, by using the calibration line LO power vs data variances (not reported here). The conversion enables an easy comparison between the measured distribution and the one expected for the vacuum state.

The distribution of the vacuum state, $\rho = |0\rangle\langle 0|$, is expected to feature a variance of $\sigma^2_{X(|0\rangle\langle 0|)} = \frac{1}{2}$ (in quadrature units). For the measured state, $\rho_{meas}$, we obtain $\sigma_{meas}^2 \cong 0.61$.

This description assumes a source-device-independent framework, i.e., it is assumes that the input port of the BS is under control of an adversary called Eve. Hence, the fact that $\sigma_{meas}^2 > \sigma^2_{X(|0\rangle\langle 0|)}$ for us is equivalent to Eve inputting some forged state $\rho_{Eve} = p_0|0\rangle\langle 0| + p_1|1\rangle\langle 1| + p_2|2\rangle\langle 2| + \ldots$ .

To obtain estimate a bound to the min-entropy according $H_{min}(X|E) \geq p_0 H_{min}(X)$ it is therefore necessary to bound $p_0$. Since after the phase randomization, the overall distribution of the quadrature measurements of $\rho_{meas}$ is given by a mixture of the quadrature distribution associated to the single photon states $|0\rangle\langle 0|, |1\rangle\langle 1|, |2\rangle\langle 2|, \ldots$ one has that the variance of said overall distribution is given by $\sigma_{meas}^2 = \Sigma_n p_n \sigma^2_{X(|n\rangle\langle n|)} = \frac{1}{2}p_0 + 3/2 p_1 + 5/2 p_2 + \ldots$, with the constraint that $p_0 + p_1 + p_2 + \ldots p_n = 1$. For example, assuming that Eve phase randomized state is $\rho_{Eve} = p_0|0\rangle\langle 0| + p_1|1\rangle\langle 1|$, one can obtain $p_0$, by solving the equation $\sigma_{meas}^2 = p_0 \frac{1}{2} + p_1 3/2 = p_0 \frac{1}{2} + (1-p_0) 3/2$, which yields $p_0 = 0.89$. In this example, for a pure vacuum state measured with the same ADC resolution one would have $H_{min}(X) = 4.714$. The bound to the min-entropy can then be estimated as $$H_{min}(X|E) \geq p_0 H_{min}(X) = 4.195 \text{ bit}$$

Hence, this value means that in each ADC sample, which is encoded in 8 bits, only 4.195 bits can be considered truly unpredictable. Hence, by applying a extractor algorithm it is possible to statistically remove the 3.8 unsecure bits. This corresponds to compress by the 47% the initial raw string. After the application of the algorithm, e.g. 2-universal hash function, one is left with a shorter but secure random bit string.

In the example, Eve was assumed to input a state $\rho_{Eve} = p_0|0\rangle\langle 0| + p_1|1\rangle\langle 1|$. For states featuring a larger number of single photon states, the value of $p_0$ can be found by solving an optimization problem of the kind Minimize: $p_0$
Such that:
1) $\sigma_{meas}^2 = \Sigma_n p_n \sigma^2_{X(|n\rangle\langle n|)}$
2) $\Sigma_n p_n = 1$ In the above described embodiment, by means of the phase randomization of the LO oscillator, the user can determine how many unpredictable bits can be extracted per sample also in the presence of an adversary providing the quantum states to be measured. Further, due to the use of the above described laser, the system to implement the phase randomization of the LO neither requires a complex item such as a separate phase modulator, nor does it use in part the generated random numbers to achieve the phase randomization.

The above described homodyne QRNG architecture simplifies the miniaturization of the QRNG with enhanced security, because it avoids the need to introduce a further phase modulator for the local oscillator.

In the above QRNG a faster generation rate is achieved, given that no number is wasted to decide when the phase modulator has to switch phase.

While certain arrangements have been described, these arrangements have been presented by way of example only, and are not intended to limit the scope of the inventions. Indeed, the apparatus and methods described herein may be embodied in a variety of other forms; furthermore various omissions, substitutions and changes in the form of the apparatuses described herein may be made.

The invention claimed is:

1. An apparatus for measuring an input signal, the apparatus comprising:
   a first light source configured to output a sequence of pulses of light, wherein there is a random relationship between the phase of the pulses,
   a beam splitter having first and second inputs and first and second outputs, said first input being arranged to receive light pulses from said first light source and the second input being arranged to receive said input signal;
   a differencing circuit adapted to subtract signals obtained from the first and second outputs from each other to determine a quadrature measurement of the input signal, the quadrature measurement being performed in a direction determined from the random relationship of the phase of the pulses, and output a value; and
   a processing circuit adapted to estimate the minimum entropy of said input signal, from the output of the differencing circuit corresponding to a sequence of said light pulses from the first light source.

2. The apparatus according to claim 1, configured as a random number generator wherein the random numbers are derived from the output of the differencing circuit.

3. The apparatus according to claim 2, wherein the processing circuit outputs an indication on the randomness of the generated random numbers from the estimate of the minimum entropy.

4. The apparatus according to claim 3, wherein the processing circuit is adapted to indicate that the numbers are random when the estimate of the minimum entropy of the input signal suggests that random numbers can be produced.

5. The apparatus according to claim 2, further comprising a randomness extractor, the randomness extractor being adapted to use the estimated entropy and produce an independently distributed set of said random numbers.

6. The apparatus according to claim 2, wherein the randomness of the random numbers is independent of the random relationship between the phase of the pulses.

7. The apparatus according to claim 1, where the input signal is the absence of light.

8. The apparatus according to claim 1, wherein the first light source comprises a semiconductor laser diode.

9. The apparatus according to claim 1, wherein the outputs of the beam splitter are directed towards optical to electric converters.

10. The apparatus according to claim 9, wherein the optical to electric converters are photodiodes.

11. The apparatus according to claim 9, wherein the beam splitter, the first light source and the optical to electrical converters are arranged in a homodyne configuration.

12. An apparatus for measuring an input signal, the apparatus comprising:
   a first light source configured to output a sequence of pulses of light, wherein there is a random relationship between the phase of the pulses;
   a beam splitter having first and second inputs and first and second outputs, said first input being arranged to receive light pulses from said first light source and the second input being arranged to receive said input signal;
   a differencing circuit adapted to subtract signals obtained from the first and second outputs from each other; and output a value;
   a processing circuit adapted to estimate the minimum entropy of said input signal, from the output of the differencing circuit corresponding to a sequence of said light pulses from the first light source; and
   a randomness extractor, the randomness extractor being adapted to use the estimated entropy and produce an independently distributed set of said random numbers, wherein the apparatus is configured as a random number generator wherein the random numbers are derived from the output of the differencing circuit, and wherein the randomness extractor is adapted to estimate the fraction of the output from the differencing circuit that needs to be removed to produce random numbers.

13. The apparatus according to claim 12, wherein the output from the differencing circuit is compressed by the estimates fraction to produce independently distributed random numbers.

14. An apparatus for measuring an input signal, the apparatus comprising:
   a first light source configured to output a sequence of pulses of light, wherein there is a random relationship between the phase of the pulses;
   a beam splitter having first and second inputs and first and second outputs, said first input being arranged to receive light pulses from said first light source and the second input being arranged to receive said input signal;
   a differencing circuit adapted to subtract signals obtained from the first and second outputs from each other; and output a value; and
   a processing circuit adapted to estimate the minimum entropy of said input signal, from the output of the differencing circuit corresponding to a sequence of said light pulses from the first light source, wherein the differencing circuit determines a quadrature measurement of an input signal, wherein the quadrature measurements of the state follow a probability distribution, the processing circuit being adapted to estimate the entropy, from the variance of the probability distribution.

15. An apparatus for measuring an input signal, the apparatus comprising:
   a first light source configured to output a sequence of pulses of light, wherein there is a random relationship between the phase of the pulses;
   a beam splitter having first and second inputs and first and second outputs, said first input being arranged to receive light pulses from said first light source and the second input being arranged to receive said input signal;
   a differencing circuit adapted to subtract signals obtained from the first and second outputs from each other; and output a value; and
   a processing circuit adapted to estimate the minimum entropy of said input signal, from the output of the differencing circuit corresponding to a sequence of said light pulses from the first light source;
   wherein the first light source comprises a semiconductor laser diode, and wherein the semiconductor laser diode is configured as a slave light source,
   the first light source further comprising:
      at least one master light source configured to intermittently generate master light pulses such that the phase of each master light pulse has a random relationship to the phase of each subsequently generated master light pulse, further configured to supply said master light pulses to the slave light source; and
      a controller, configured to apply a time varying drive signal to said at least one slave light source such that just one slave light pulse is generated during each period of time for which a master light pulse is received, such that the phase of each slave light pulse has a random relationship to the phase of each subsequently generated slave light pulse.

16. A method for measuring an input signal, the method comprising:
   receiving an input from a first light source configured to output a sequence of pulses of light, wherein there is a random relationship between the phase of the pulses;
   receiving at a beam splitter having first and second inputs and first and second outputs, light pulses from said first light source at the first input and the input signal at the second input;
   subtracting signals obtained from the first and second outputs from each other to determine a quadrature measurement of the input signal, the quadrature measurement being performed in a direction determined from the random relationship of the phase of the pulses; and outputting a sequence of values corresponding to a sequence of said light pulses from the first light source; and
   estimating the minimum entropy of said input signal, from the said sequence of values.

17. The method according to claim 16, further comprising using the sequence of values to produce random numbers.

18. The method according to claim 17, further comprising providing an indication on the randomness of the random numbers from the estimate of the minimum entropy.

19. The method according to claim 18, wherein the estimate of the minimum entropy is used to determine the fraction of the information determined from sequence of values that need to be removed to produce random numbers.

20. The method according to claim 19, wherein the sequence of values is compressed using a statistical technique to produce random numbers.

* * * * *